United States Patent
Aderhold et al.

(10) Patent No.: US 8,104,951 B2
(45) Date of Patent: Jan. 31, 2012

(54) TEMPERATURE UNIFORMITY MEASUREMENTS DURING RAPID THERMAL PROCESSING

(75) Inventors: Wolfgang Aderhold, Cupertino, CA (US); Andreas G. Hegedus, Burlingame, CA (US); Nir Merry, Mountain View, CA (US)

(73) Assignee: Applied Materials, Inc., Santa Clara, CA (US)

(*) Notice: Subject to any disclaimer, the term of this patent is extended or adjusted under 35 U.S.C. 154(b) by 516 days.

(21) Appl. No.: 11/830,845

(22) Filed: Jul. 30, 2007

(65) Prior Publication Data

US 2008/0025368 A1    Jan. 31, 2008

Related U.S. Application Data

(60) Provisional application No. 60/820,954, filed on Jul. 31, 2006.

(51) Int. Cl.
G01K 3/06 (2006.01)
G01N 25/00 (2006.01)
G01J 5/00 (2006.01)
H01L 21/02 (2006.01)

(52) U.S. Cl. .......... 374/5; 374/129; 374/137; 374/30; 374/124; 118/666; 438/54; 438/795

(58) Field of Classification Search .......... 250/338.1, 250/E21.53, E21.091; 374/120, 121, 124, 374/126, 4–5, 6–7, 112, 137, 129, 29, 100, 374/153, 30, 110, 115, 167, 178; 438/14, 438/15, 17, 530, 584, 763, 18, 54, 50; 118/666, 118/712
See application file for complete search history.

(56) References Cited

U.S. PATENT DOCUMENTS

| | | | | |
|---|---|---|---|---|
| 4,284,867 A * | 8/1981 | Hill et al. | ...... | 219/634 |
| 5,350,899 A * | 9/1994 | Ishikawa et al. | ...... | 219/494 |
| 5,490,728 A * | 2/1996 | Schietinger et al. | ...... | 374/121 |
| 5,741,070 A | 4/1998 | Moslehi | | |
| 5,743,643 A | 4/1998 | Gronet et al. | | |
| 5,775,808 A * | 7/1998 | Pan | ...... | 374/161 |
| 5,985,678 A * | 11/1999 | Kiyama | ...... | 438/5 |
| 6,079,874 A * | 6/2000 | Hegedus | ...... | 374/112 |
| 6,190,040 B1 | 2/2001 | Renken et al. | | |
| 6,215,897 B1 * | 4/2001 | Beer et al. | ...... | 382/151 |
| 6,217,212 B1 | 4/2001 | Brenninger et al. | | |
| 6,424,879 B1 * | 7/2002 | Chilese et al. | ...... | 700/121 |

(Continued)

FOREIGN PATENT DOCUMENTS

JP        10012689 A * 1/1998

(Continued)

OTHER PUBLICATIONS

International Search Report and Written Opinion of International Application No. PCT/US07/17190 mailed May 7, 2008.

(Continued)

*Primary Examiner* — Gail Verbitsky

(74) *Attorney, Agent, or Firm* — Dugan & Dugan, PC

(57) ABSTRACT

Methods and apparatus for measuring substrate uniformity is provided. The invention includes placing a substrate in a thermal processing chamber, rotating the substrate while the substrate is heated, measuring a temperature of the substrate at a plurality of radial locations as the substrate rotates, correlating each temperature measurement with a location on the substrate, and generating a temperature contour map for the substrate based on the correlated temperature measurements. Numerous other aspects are provided.

19 Claims, 11 Drawing Sheets

U.S. PATENT DOCUMENTS

| | | | |
|---|---|---|---|
| 6,434,327 B1* | 8/2002 | Gronet et al. | 392/416 |
| 6,476,362 B1* | 11/2002 | Deacon et al. | 219/390 |
| 6,479,801 B1* | 11/2002 | Shigeoka et al. | 219/502 |
| 6,492,625 B1 | 12/2002 | Boguslavskiy et al. | |
| 6,503,368 B1* | 1/2003 | Kholodenko et al. | 156/345.51 |
| 6,575,622 B2* | 6/2003 | Norrbakhsh et al. | 374/141 |
| 6,616,332 B1 | 9/2003 | Renken et al. | |
| 6,847,433 B2* | 1/2005 | White et al. | 355/72 |
| 6,919,271 B2* | 7/2005 | Gat | 438/663 |
| 6,950,774 B2* | 9/2005 | Donald | 702/150 |
| 7,026,581 B2* | 4/2006 | Pharand et al. | 219/392 |
| 7,029,930 B2* | 4/2006 | Tomer et al. | 438/14 |
| 7,080,940 B2* | 7/2006 | Gotthold et al. | 374/161 |
| 7,398,693 B2* | 7/2008 | Ranish et al. | 73/727 |
| 7,629,184 B2* | 12/2009 | Kulp | 438/14 |
| 2001/0036219 A1* | 11/2001 | Camm et al. | 374/112 |
| 2003/0109071 A1* | 6/2003 | Wang et al. | 438/14 |
| 2003/0159650 A1* | 8/2003 | Yang et al. | 117/89 |
| 2005/0098092 A1* | 5/2005 | Wilson et al. | 117/84 |
| 2006/0228818 A1* | 10/2006 | Chacin et al. | 438/18 |
| 2007/0009010 A1* | 1/2007 | Shio et al. | 374/161 |
| 2007/0022832 A1* | 2/2007 | Hunter | 73/865.9 |
| 2007/0238202 A1* | 10/2007 | Ranish et al. | 438/14 |
| 2009/0284730 A1* | 11/2009 | Van Der Schoot et al. | 355/72 |
| 2011/0143016 A1* | 6/2011 | Hong et al. | 427/8 |
| 2011/0171380 A1* | 7/2011 | Higashi et al. | 427/248.1 |
| 2011/0217852 A1* | 9/2011 | Suzaki et al. | 438/795 |

FOREIGN PATENT DOCUMENTS

| | | |
|---|---|---|
| JP | 11220007 A | 8/1999 |
| WO | WO 2005/062346 A1 | 7/2005 |
| WO | WO 2008/016647 A2 | 2/2008 |

OTHER PUBLICATIONS

International Preliminary Report on Patentability of International Application No. PCT/US07/17190 mailed Feb. 12, 2009.

* cited by examiner

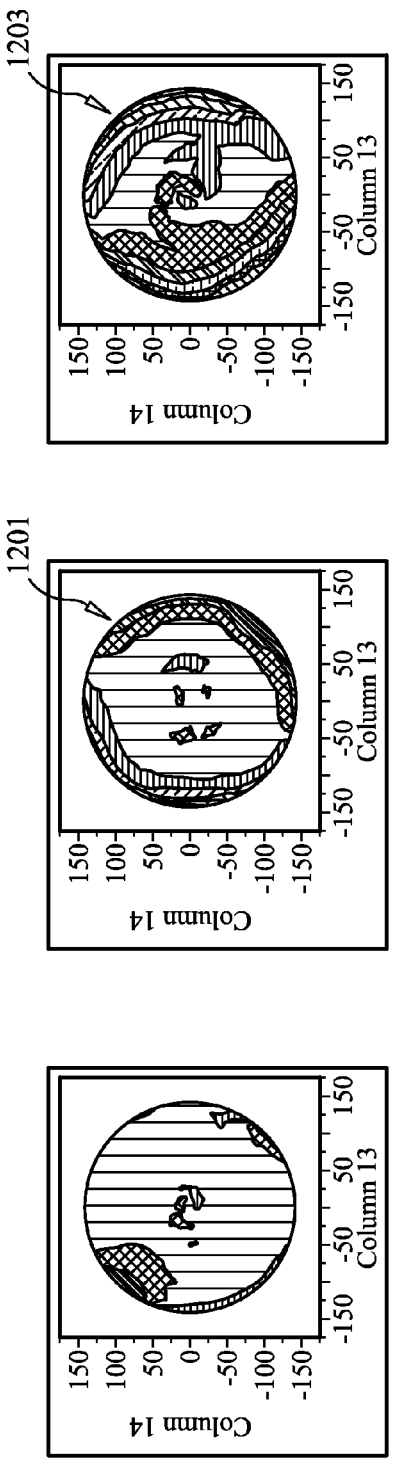
FIG. 9A
FIG. 9B
FIG. 9C
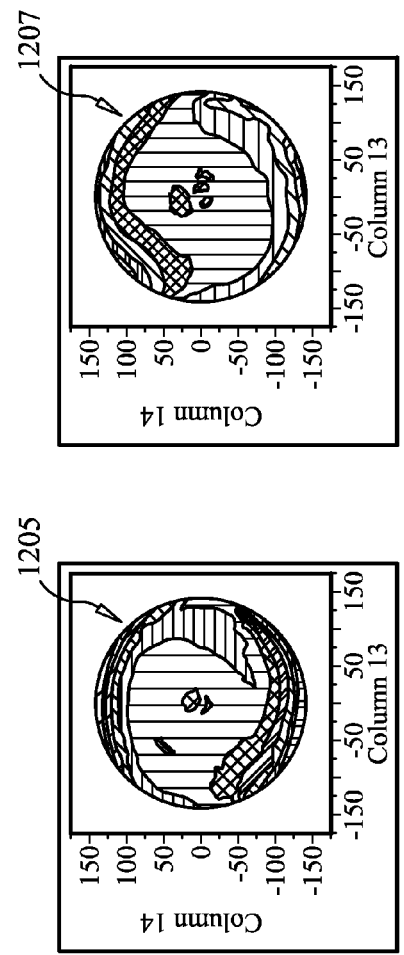
FIG. 9D
FIG. 9E

TEMPERATURE UNIFORMITY MEASUREMENTS DURING RAPID THERMAL PROCESSING

The present application claims priority from U.S. Provisional Patent Application Ser. No. 60/820,954, filed Jul. 31, 2006, which is hereby incorporated by reference herein in its entirety.

FIELD OF THE INVENTION

The present invention relates to electronic (e.g., semiconductor) device manufacturing, and more particularly to temperature uniformity measurements during rapid thermal processing.

BACKGROUND OF THE INVENTION

To improve film uniformity during rapid thermal processing (RTP), test substrates referred to as "monitor" substrates may be processed within an RTP tool and then analyzed. For example, stand alone metrology tools such as an ellipsometer or sheet resistance measurement tool may be used to measure film thickness or sheet resistance uniformity. A production process that undergoes similar rapid thermal processing is assumed to have similar film thickness or sheet resistance uniformity. Accordingly, an RTP tool process may be optimized using the information from analyzing monitor substrates, and then the optimized process may used during production.

However, the use of monitor substrates is time consuming and expensive, requiring significant tool time while the monitor substrates are processed and analyzed before the process may be optimized. Accordingly, a need exists for methods and apparatus for determining process uniformity without the use of monitor substrates.

SUMMARY OF THE INVENTION

In some aspects of the invention, a method of measuring substrate uniformity is provided. The method includes placing a substrate in a thermal processing chamber, rotating the substrate while the substrate is heated, measuring a temperature of the substrate at a plurality of radial locations as the substrate rotates, correlating each temperature measurement with a location on the substrate, and generating a temperature contour map for the substrate based on the correlated temperature measurements.

In other aspects of the invention, an apparatus for measuring substrate uniformity is provided. The apparatus includes (1) a thermal processing chamber having: i) a central assembly having a rotation assembly adapted to support and rotate the substrate; ii) a heat source adapted to apply heat to the substrate; and iii) a plurality of temperature probes positioned with respect to the central assembly so as to measure temperature at a plurality of radial locations on the substrate as the substrate rotates. The apparatus also includes (2) a temperature measurement controller adapted to correlate temperature measurements locations on the substrate and to generate a temperature contour map for the substrate based on the correlated temperature measurements.

Other features and aspects of the present invention will become more fully apparent from the following detailed description, the appended claims and the accompanying drawings.

BRIEF DESCRIPTION OF THE DRAWINGS

FIG. 9A is an exemplary contour map determined in accordance with some embodiments of the present invention for a substrate that is properly positioned on the edge ring during thermal processing.

FIGS. 9B, 9C, 9D and 9E are exemplary temperature contour maps determined in accordance with some embodiments of the present invention in which the substrate is shifted to the left, right, up and down, respectively relative to the edge ring.

DETAILED DESCRIPTION

The present invention provides methods and apparatus for determining the uniformity of a process performed within an RTP tool. For example, variation in film thickness and sheet resistance are related to temperature variation across a substrate. Embodiments of the present invention allow monitoring of temperature uniformity of a substrate processed in an RTP tool based on data provided by the RTP tool (e.g., without requiring the substrate to be analyzed in a stand alone or other metrology tool such as an ellipsometer or sheet resistance measurement tool). For example, temperature data generated by an RTP tool while a substrate is processed may be employed to generate a temperature map, such as a contour map, of the substrate during processing. Such temperature data also may be used to identify process uniformity issues, tool problems and/or faults, and the like.

In some embodiments, temperature data analysis may be performed in real time and/or while a substrate is being processed. Temperature data also may be analyzed post processing.

Because existing temperature data from an RTP tool is employed, implementation of the present invention is inexpensive and the use of monitor substrates is eliminated. For example, temperature data from dummy substrates or production substrates may be used to determine process uniformity.

Figure 1:
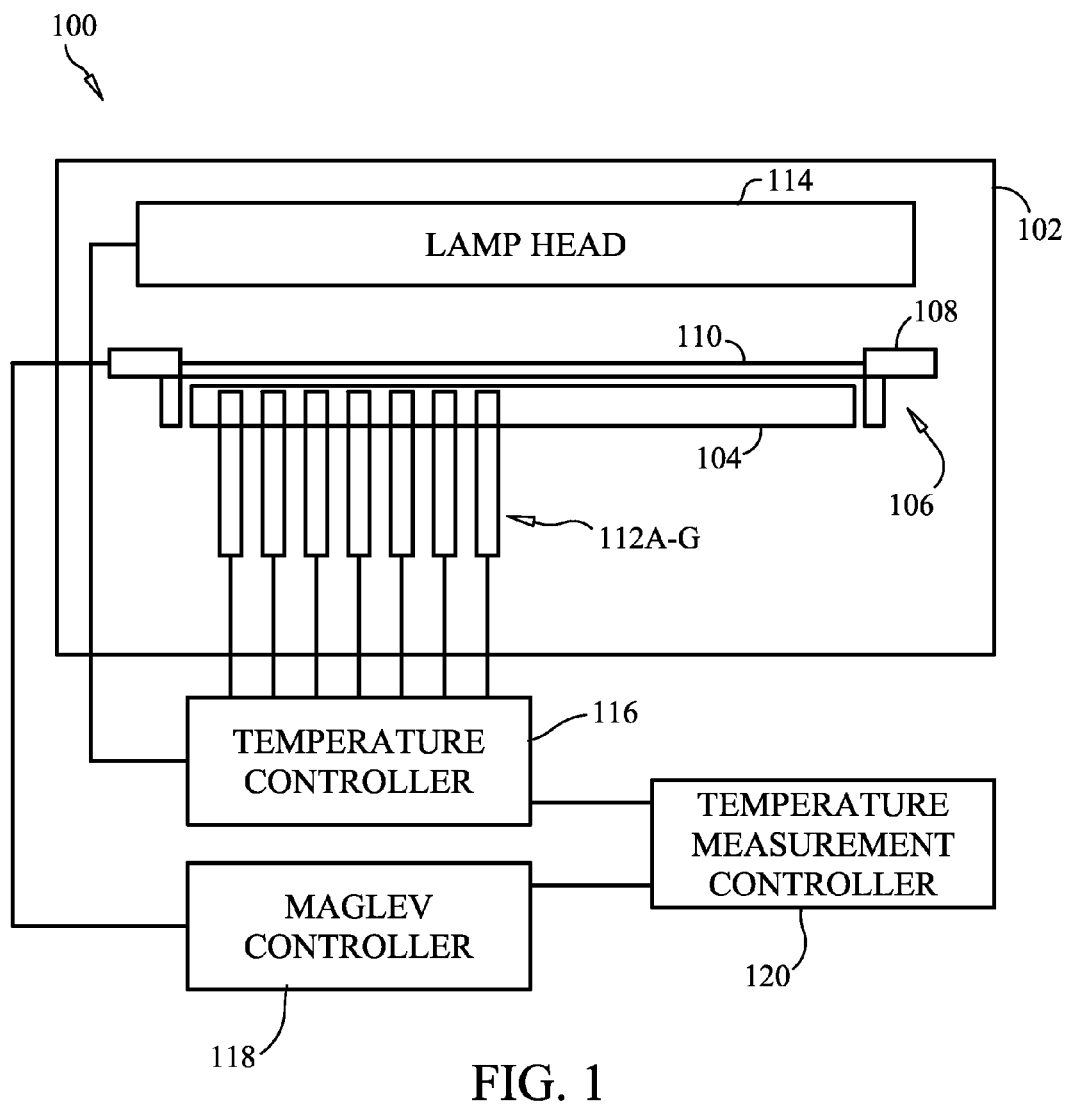
FIG. 1 is a schematic view of an exemplary rapid thermal processing (RTP) tool provided in accordance with the present invention.

FIG. 1 is a simplified schematic view of an exemplary rapid thermal processing (RTP) tool 100 provided in accordance with the present invention. The RTP tool 100 may be based on, for example, a 300 mm Vantage chamber available from Applied Materials, Inc. of Santa Clara, Calif., or any other suitable RTP system.

With reference to FIG. 1, the RTP tool 100 includes a processing chamber 102 that includes a central assembly 104 and a magnetic levitation (maglev) rotation assembly 106 positioned near an outer edge of the central assembly 104. The maglev rotation assembly 106 includes an edge ring 108 adapted to contact a substrate 110 and support and rotate the substrate 110 above the central assembly 104. Although not pictured, other assemblies adapted to rotate the substrate 110 may be used.

The central assembly 104 includes a plurality of temperature measurement probes, such as pyrometers 112A-G, radially spaced along the central assembly 104 and positioned to measure the temperature of the substrate 110 at various radial distances along the substrate 110. In some embodiments, a heat reflector, not shown, may be positioned along a top surface of the central assembly 104 for reflecting heat emitted from the substrate 110 back toward the substrate 110, and the central assembly 104 may be cooled (e.g., so as to cool the reflector).

A lamp head 114 may be positioned above the substrate 110 and central assembly 104 for heating the substrate 110 during rapid thermal processing within the RTP chamber 102. A temperature controller 116 may be coupled to and receive temperature information from the pyrometers 112A-G and use the temperature information to adjust the lamp head 114 (and thus regulate temperature across the substrate 110).

A maglev controller 118 may be provided for controlling operation of the maglev rotation assembly 106. For example, the maglev controller 118 may control the distance that the substrate 110 is raised above the central assembly 104, the rate at which the substrate 110 is rotated and/or the like. Additional exemplary embodiments of a chamber 102 including a central assembly 104 and a maglev rotation assembly 106 are described in U.S. Pat. No. 6,157,106 which is hereby incorporated by reference herein in its entirety.

As shown in FIG. 1, the RTP tool 100 includes a temperature measurement controller 120 that receives information from both the temperature controller 116 and the maglev controller 118. Based on information from the temperature controller 116 and the maglev controller 118, the temperature measurement controller 120 may determine a temperature profile such as a temperature contour map for the substrate 110 as described further below. The temperature controller 116, the maglev controller 118 and/or the temperature measurement controller 120 may be embodied in a single controller or as multiple controllers. Each controller may include one or more appropriately programmed microprocessors or microcontrollers, memory devices, dedicated hardware, and/or a combination of the same.

In operation, the substrate 110 is loaded into the processing chamber 102 and onto the edge ring 108 of the maglev rotation assembly 106. The edge ring 108 holds the substrate 110 above the central assembly 104 and rotates the substrate 110 (e.g., via a magnetically levitated and rotated cylinder/rotor (not shown)) under control of the maglev controller 118. In at least one embodiment, the substrate 110 is rotated at about 4 hertz or 240 RPM (e.g., 4 revolutions per second) through about 32 evenly distributed rotor positions, although other rotation rates and/or numbers of rotor positions may be used.

Hall or similar sensors (not shown) may be used to monitor rotation/position, and substrate position may be measured by the maglev controller 118 (e.g., Theta(t) where theta is angular position of the substrate relative to a reference point such as a notch and t is time).

The temperature controller 116 directs the lamp head 114 to heat the substrate 110 to a desired temperature, and monitors the substrate temperature using, for example, pyrometers 112A-G. In one or more embodiments, the pyrometers 112A-G may be sampled at a rate of about 100 hertz, although other sampling rates may be used. Temperature versus time for each pyrometer 112A-G thereby is measured (e.g., $T_n(t)$ where n represents a given pyrometer). Based on the information from pyrometers 112A-G, the temperature controller 116 may adjust the lamp head 114 to improve temperature uniformity across the substrate 110.

After processing, the temperature controller 116 turns off the lamp head 114 and the maglev controller 118 stops rotation of the substrate 110. The substrate 110 may then be unloaded from the processing chamber 102 for further processing.

Substrate temperature information from the temperature controller 116 and substrate angular position information from the maglev controller 118 are also fed to the temperature measurement controller 120 (during and/or after processing). For example, Theta(t) from the maglev controller 118 and $T_n(t)$ from the temperature controller 116 may be fed to the temperature controller 120.

With knowledge of angular substrate position versus time (Theta(t)) and temperature information for each pyrometer ($T_n(t)$), a temperature map of the substrate may be determined for any time window during rapid thermal processing. Exemplary embodiments for determining a temperature map for a substrate are described below with reference to FIGS. 2 to 11.

In at least one embodiment, a coordinate location on a substrate may be determined for each temperature measurement made. For example, the temperature controller 116 may provide temperature data at a rate of about 100 Hz from the probes (e.g., pyrometers 112A-G), which represents circumferential temperature information. The combination of all 7 probes provides time-based substrate mapping. Coupling the rotational position of the substrate 110 with the known x/y location of a probe provides an unambiguous location for a given temperature datum from the probe on the substrate. Measured and estimated temperature of a substrate over time windows obtained during performance of a recipe may be provided. For example, calculated values may be represented as a contour map over the substrate 110. The contour map may show information including: (1) temperature uniformity; (2) peak temperature; (3) time above temperature; and/or (4) temperature gradient (rotational uniformity).

In one or more embodiments, the temperature measurement controller 120 may execute software which may expand the temperature data from the temperature controller 116 and rotor (rotational) data from the maglev controller 118 into substrate (e.g., wafer) contour data. For example, input data may be provided by the temperature controller 116 with one or more timestamp arrays indicating times at which temperatures were measured at the probes. In some embodiments, the data is provided at a frequency of about 100 Hz, although other rates may be used.

The maglev rotation speed may vary from about 0.1 Hz to about 10 Hz, for example. In at least one embodiment, a rotation speed of about 240 RPM (4 Hz) is used. However, a deviation from that value is possible during ramping, or due to variations of the rotation control. Also, flexibility of the rotation speed may be provided for troubleshooting (e.g., lower speed than 4 Hz) and for process improvements (e.g., higher speed than 4 Hz). The angular precision of the coordinate points on the substrate preferably is better than 1.5 degrees, although other angular precision values may be used.

The probes/sensors, e.g., pyrometers 112A-G, measure each distinct point on the substrate only at the rotation rate, but the variation within a given radial distance is a slowly moving function in time and as such prior information will allow reasonable estimation of temperature at a later point in time. In general, the underlying temperature profile may be similar among all the radial positions and a slow moving function relative to the sampling rate. In the calculation of peak temperature, in some embodiments, the maximum for any given x/y location may not be used. For example, a smoothing function that estimates the peak temperature as well as slope changes may be employed.

An exemplary method for determining substrate temperature versus position is now described. For the exemplary methods described herein, the following table of definitions may be used.

TABLE 1

Parameter Definitions

| | |
|---|---|
| n | probe number (integer) [n = 1, 2, . . . 7] |
| t | time stamp |
| tss1 | start time with steady state rotation |
| tss2 | end time for steady state rotation |
| V | number of rotations [v = 1, 2, . . . .] |
| a | angular position on substrate relative to notch (0 <= $a_o$ < v*360) |
| $a_o$ | angular position on substrate relative to notch (0 <= $a_o$ < 360) |
| r | radial position on substrate relative to center |
| w | Frequency |
| T (t, n) | temperature of probe over time |
| Tc (t, n) | temperature of probe over time (only part of steady state rotation) |
| FTc (w, n) | Fourier transform of Tc(t, n) |
| TTR (t, n) | average temperature trend of probe over time |
| FTTR (w, n) | Fourier transform of TTR(t, n) |
| dT (t, n) | temperature uniformity of probe over time |
| t1r (v) | time of hitting home flag per rotation number |
| tc = t-t1r (v) | time from start of rotation v until end of rotation v |
| dTc (v, tc, n) | temperature variation over time tc per period v for probe n |
| FdTc (v, w, n) | Fourier transform of dTc |
| dTROT (v, tc, n) | rotational temperature uniformity over time tc per period v for probe n |
| FdTROT (v, w, n) | Fourier transform of dTROT |
| RP(t) | angular rotor position relative to home |
| $w_{min}$ | lowest rotation frequency within a spectrum (Fourier transform) |
| FRP (v, w) | Fourier transform of angular rotor position |
| RS (t) | Rotation speed over time |
| RSs | nominal rotor speed (from system, recipe parameter) |
| RSc (v) | Rotation speed per rotation period |
| AMP (v, n) | Amplitude of rotational contributions to the uniformity |
| PSI (v, n) | Phase of rotational contributions to the uniformity |
| rP (n) | radial location of probe |
| AP (n) | angular probe position |
| APWN | angular substrate notch position relative to slit valve at substrate transfer |
| $T_o$ (t, n) | temperature of probe over time synchronized relative to home position |
| $dT_o$ (t, n) | temp unifty of probe vs time synchronized relative to home position |
| $dT_o$c (v, tc, n) | temp unifty of probe vs time synch rel to home position based on dTc |
| $dT_o$ROT (v, tc, n) | rotational temp unifty of probe vs time synch rel to home position |
| $RP_o$(t) | angular rotor home position relative to substrate notch over time |

TABLE 1-continued

Parameter Definitions

| | |
|---|---|
| TT (t, X, Y) | temperature Trend over time, substrate coordinate |
| TTc (t, X, Y) | temperature Trend over time, substrate coordinate based on dTc |
| dTa (t, X, Y) | temperature uniformity over time, substrate coordinate |
| dTac (v, X, Y) | temperature unif over rotation, substrate coordinate based on dTc |
| dTaROT (v, X, Y) | rotational temp unif over rotation, substrate coordinate |
| m | Contour integer [m = 1, 2, . . . p] as defined by map algorithm |
| k (m) | Point number (integer) [k = 1, 2, . . . q (m)] as defined by map algorithm |
| X (k(m), m) | point position x coordinate |
| Y (k(m), m) | point position y coordinate |
| TEMPABOVE | Temperature for time above |
| MAPTIME | Time where Map is needed |
| tP (x, Y) | Time for temp above over substrate coordinate |
| tPc (x, Y) | Time for temp above over substrate coordinate based on dTc |
| TTmax (X, Y) | maximum temperature over substrate coordinate |
| TTcmax (X, Y) | maximum temperature over substrate coordinate based on dTc |
| RPs | rotor rotation speed set point (recipe parameter) |
| USD | Flag set if substrate is run upside down |
| RP (n) | radial location of the probes |
| AP (n) | angular location of the probes |
| MAPTIME | User defined Time where map shall be plotted |
| TEMPABOVE | the user defined Temperature value above which time of peak width is calculated |

As indicated above, in at least one embodiment, the temperature data T(t,n) is transmitted with a rate of 100 Hz. The rotor position RP(t) is provided with a rate of 100 Hz synchronized with the temperature data. The Angular Substrate Notch position (APWN) is based on the aligner settings, or is user defined (default is 0°).

The data referenced here is 100 Hz temperature data from the probes in the 300 mm RTP Radiance Plus chamber, available from Applied Materials, Inc. of Santa Clara, Calif. In this example, there are 7 probes and each calculation is done for each probe individually. The example calculations are based on a nominal 4 Hz rotation and 100 Hz sampling frequency to provide 25 unique sampled locations within each radius as swept out by the rotating substrate. Temperature data and rotational data are transformed to obtain average temperature trend, temperature uniformity and rotational uniformity information for each probe radius as a function of time. For example, in a first procedure (a):

a. For each probe Temperature data T(t,n), the data may be truncated to include data only after the maglev has reached a steady state speed.

The time range for steady state rotation may be defined as the time at which the rotation is at or above 95% of the nominal motor rotation speed:

$RS(t) >= RSs * 0.95$ for all $t < tss1$ and $t > tss2$

Temperature data before and after the rotation speed reaches this value are given the value of zero.

$Tc(t,n) = 0$ for $t < tss1$ $Tc(t,n) = T(t,n)$ for $tss1 < t < tss2$ $Tc(t,n) = 0$ for $t > tss2$ In example procedures (b) and (c) below, the temperature data may be filtered to remove high-frequency components:

b. A discrete Fourier Transform DFT is performed on the data set.

$Tc(t,n) ---o FTc(w,n)$ c. Set a zero filter to include all frequencies greater than the steady state rotational frequency from the maglev −5% (e.g., for a 4 Hz rotation all frequencies greater than 3.8 Hz would have a zero filter applied).

$$FTTR(w,n)=0 \text{ for all } w>RSs*0.95$$

$$FTTR(w,n)=FTc(w,n) \text{ for all } w<=RSs*0.95$$

In example procedure (d), an inverse Fast Fourier Transform may be performed to generate an average temperature trend:

$$FTTR(w,n)o\text{---}TTR(t,n) \qquad \text{d.}$$

In additional procedures, further information may be obtained. For example, in example procedure (e), temperature uniformity may be obtained by subtracting the trend data from procedure (d) from the actual temperature data as follows:

$$dT(t,n)=T(t,n)-TTR(t,n) \qquad \text{e.}$$

In a subsequent example procedure (f), the temperature uniformity may be used to generate the relevant uniformity for each rotation by transforming data chunks of dT(t,n), e.g., for three periods at a time. It is noted that each rotation may start with the rotor passing a home position and end with the rotor passing home position the next time:

$$t1r(v)=t \text{ for } RP(t)=0 \text{ } tss1<t<tss2$$

In an alternative embodiment of example procedure (f), a Fourier transform may be performed on the temperature uniformity data for tlr(v−1)<t<tlr(v+2)} assuming an infinite repetition of three periods (e.g., calculation is repeated for each v), and an inverse Fourier transform may be performed to generate temperature uniformity data per rotation period v:

$$FdTc(v,w,n)o\text{---}dTc(v,tc,n) \quad \text{with} \quad tc=t-t1r(v)$$
$$\text{and } tc<=tlr(v+1)-tlr(v)$$

Alternatively, the Fourier transformation may be replaced by averaging the data dT(t,n) over, e.g., three rotation periods.

In an additional alternative embodiment of procedure (f), temperature variation over time tc per period v for a probe may be obtained using an averaging algorithm.

In a subsequent example procedure (g), a rotational spectral contribution may be extracted separately:

g. First a rotational frequency per period v is determined:

$$RP(t)\{\text{for } tlr(v-1)<t<tlr(v+2)\}*$$

The rotational frequency may be obtained, for example, from the extrapolation of $$RP(t)\{\text{for } tlr(v)<t<tlr(v+1)\}$$

and determination of the intercept t=ti1 of the line RPc(t) where RPc(t)=0, and t=ti2 where RPc(t)=360

The rotation speed per rotation period is then:

$$RSc(v)=1/(ti2-ti1)$$

In an alternative embodiment of example procedure (g), rotational temperature uniformity per rotation period v is obtained from the Fourier transform of the temperature variation at the rotation speed per rotation period RSc(v) per period v:

$$FdTROT(v,w,n)=FdTc(v,RSc(v),n),$$

and performing an inverse Fast Fourier Transform on the rotational temperature uniformity over time tc per period v:

$$FdTROT(v,w,n)o\text{---}dTROT(v,tc,n) \quad \text{with} \quad tc=t-t1r(v)$$
$$\text{and } tc<=tlr(v+1)-tlr(v)$$

In another alternative embodiment of example procedure (g), the rotational contributions to the uniformity for period v are calculated by fitting the following function to dTc(v,tc,n):

$$dTROT(v,tc,n)=AMP(v,n)*\sin(RSc(v)/360*2*PI-PSI(v,n))$$

The temperature data over time may be transformed into temperature data over time and location (contour). Locations may defined by the user, e.g., the locations need not coincide with the radial probe location, or with the angular location given by the 100 Hz data rate. The rate of repetition may be the same rate as the rotation. This means, for example, that out of 7 temperature data values for each rotation t along a particular angle Theta(t), 7*q*p temperature values may be generated by extrapolating from data proximate to a particular data point both spatially and/or temporally.

In example procedure (h), temperature data over time is transformed into temperature data over location and time relative to the substrate notch.

$$TTR(t,n)\rightarrow TTR_o(a,rP) \qquad \text{h.}$$

$$dT(t,n),RP(t),rP(n),AP(n),APWN \rightarrow dT_o(a,rP)$$

$$dTc(v,tc,n),RP(t),rP(n),AP(n),APWN \rightarrow dT_oc(v,a_o,rP)$$

$$dTROT(v,tc,n),RP(t),rP(n),AP(n),APWN \rightarrow dT_oROT(v,a_o,rP)$$

This transformation is preferably performed in light of the rotation direction with regard to conventions for positive angle on the contour map, as well as the angular difference between the substrate notch, rotation home and probe location. According to one convention, in contour maps or graphs, a positive angle is counter clockwise with respect to a home orientation.

Figure 2:
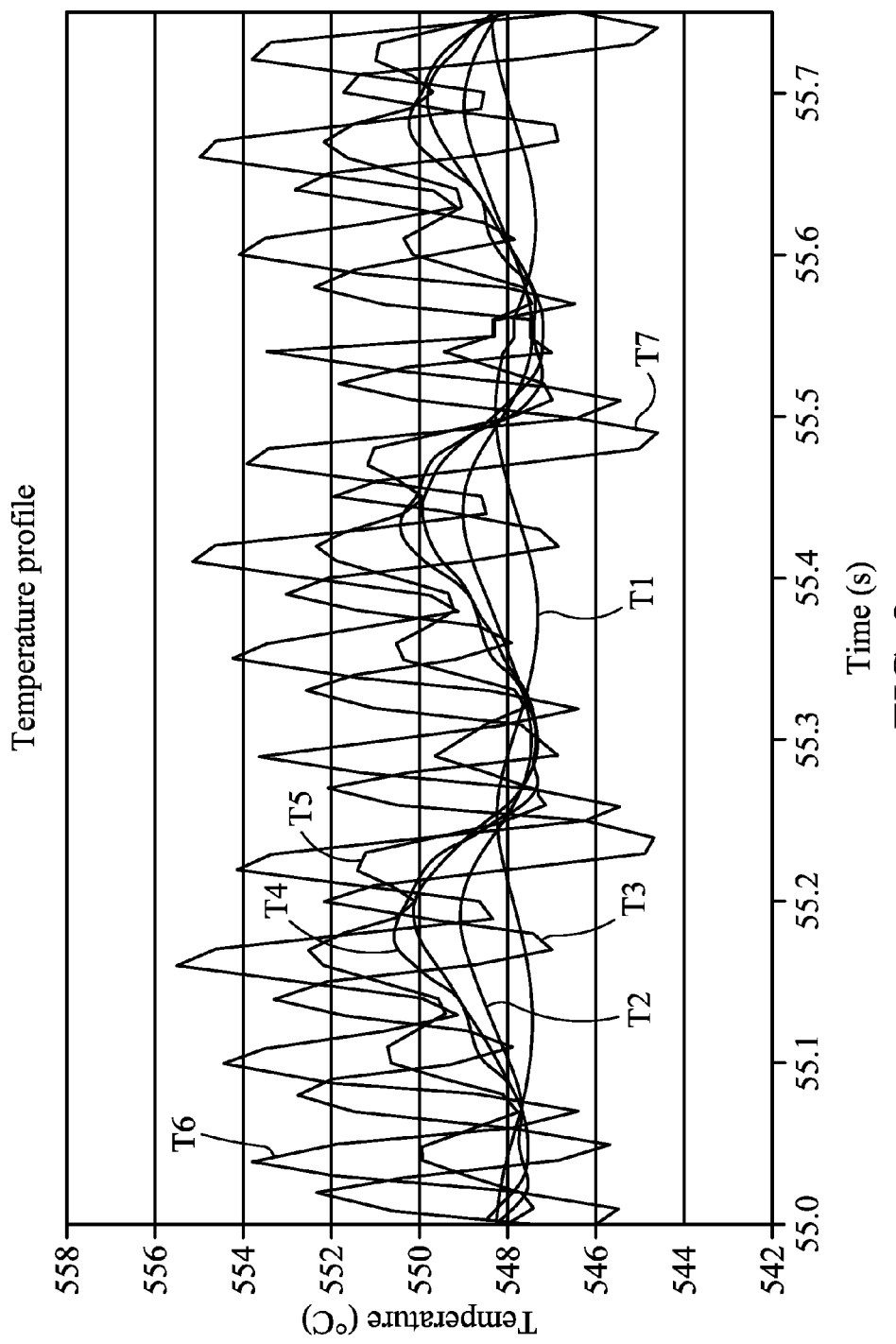
FIG. 2 is a graph depicting several series of exemplary temperature controller data, one series for each of seven (7) probes over time.
Figure 3:
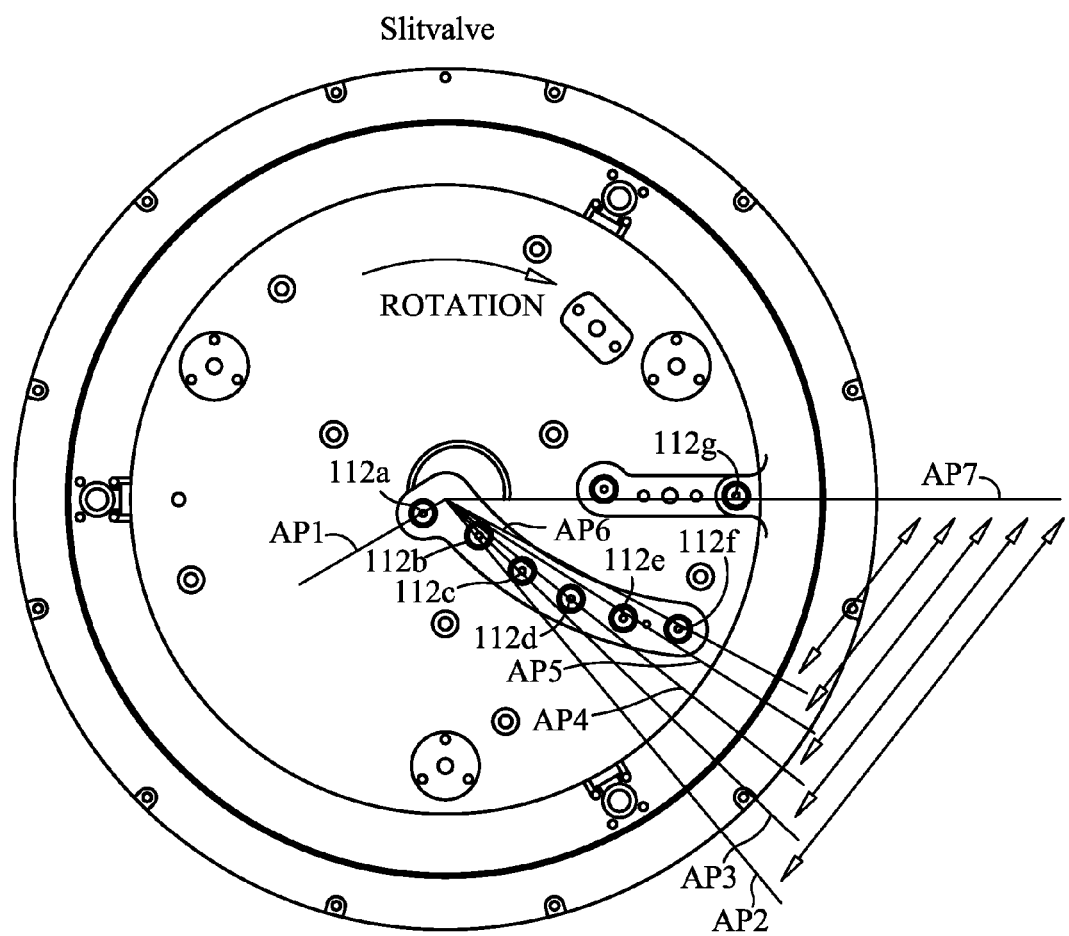
FIG. 3 is a bottom plan view of a central assembly according to embodiments of the present invention, showing exemplary locations of probes.

FIG. 2 is a graph depicting several series of exemplary temperature controller data, one series for each of seven (7) probes (e.g., pyrometers 112A-G) over time. FIG. 3 is a bottom plan view of the central assembly 104 according to an embodiment of the present invention, showing exemplary locations of the probes 112A-G.

Referring again to FIG. 2, the time window for the data is 750 ms, which includes three (3) full rotations of the substrate 110 at a rotation speed of 240 RPM (4 Hz). Note that the temperature data for probes 5, 6 and 7 shows four (4) distinct peaks per rotation, with declining amplitude towards the center. In this case, the peaks and valleys are due to four (4) temperature dips on the substrate edge equally distributed along the circumference. The T7 data shows these peaks earlier than T6 and the other probes. This is due to the angular difference between the probes relative to probe 7 (112G), which is shown in Table 2 below.

TABLE 2

Probe locations (as in FIG. 3) relative to T7 position

| Probe N | Radius rP(n) (mm) | Angle Offset AP(n) (°) |
| --- | --- | --- |
| 1 | 12.2 | 220 |
| 2 | 25.1 | 50 |
| 3 | 50.6 | −45 |
| 4 | 76.2 | −40 |
| 5 | 101.6 | −35 |
| 6 | 127 | −30 |
| 7 | 139.7 | 0 |

In one or more embodiments, a first correction may be made for the angular differences to synchronize the temperature data:

$$dT_o(t,n)=dT[\{t+AP(n)/RP(t)\},n]$$

$$dT_oc(v,tc,n)=dTc[v,\{tc+AP(n)/RP(t)\},n]$$

$$dT_oROT(v,tc,n)=dTROT[v,\{tc+AP(n)/RP(t)\},n]$$

In the formulas above, parameter comparison of time t and the angular function $RP_o(t)$ yields the temperature over angle information, taking the notch position into account:

$$a=RP_o(t)=360-RP(t+APWN/RP(t))$$

$$a_o=MOD(a,360) \text{ as } a_o \text{ is } 0<=a<360$$

When substrates are rotated upside down, the flag USD is set and the transformation becomes:

$$a=RP_o(t)=RP(t+APWN/RP(t))$$

A parameter comparison of probe number n and radial position rP(n) is then performed to obtain data over substrate location:

$$dT_o(t,n) \rightarrow dT_o(a,rP)$$

$$dT_oc(v,tc,n) \rightarrow dT_oc(v,a_o,rP)$$

$$dT_oROT(v,tc,n) \rightarrow dT_oROT(v,a_o,rP)$$

Figure 4:
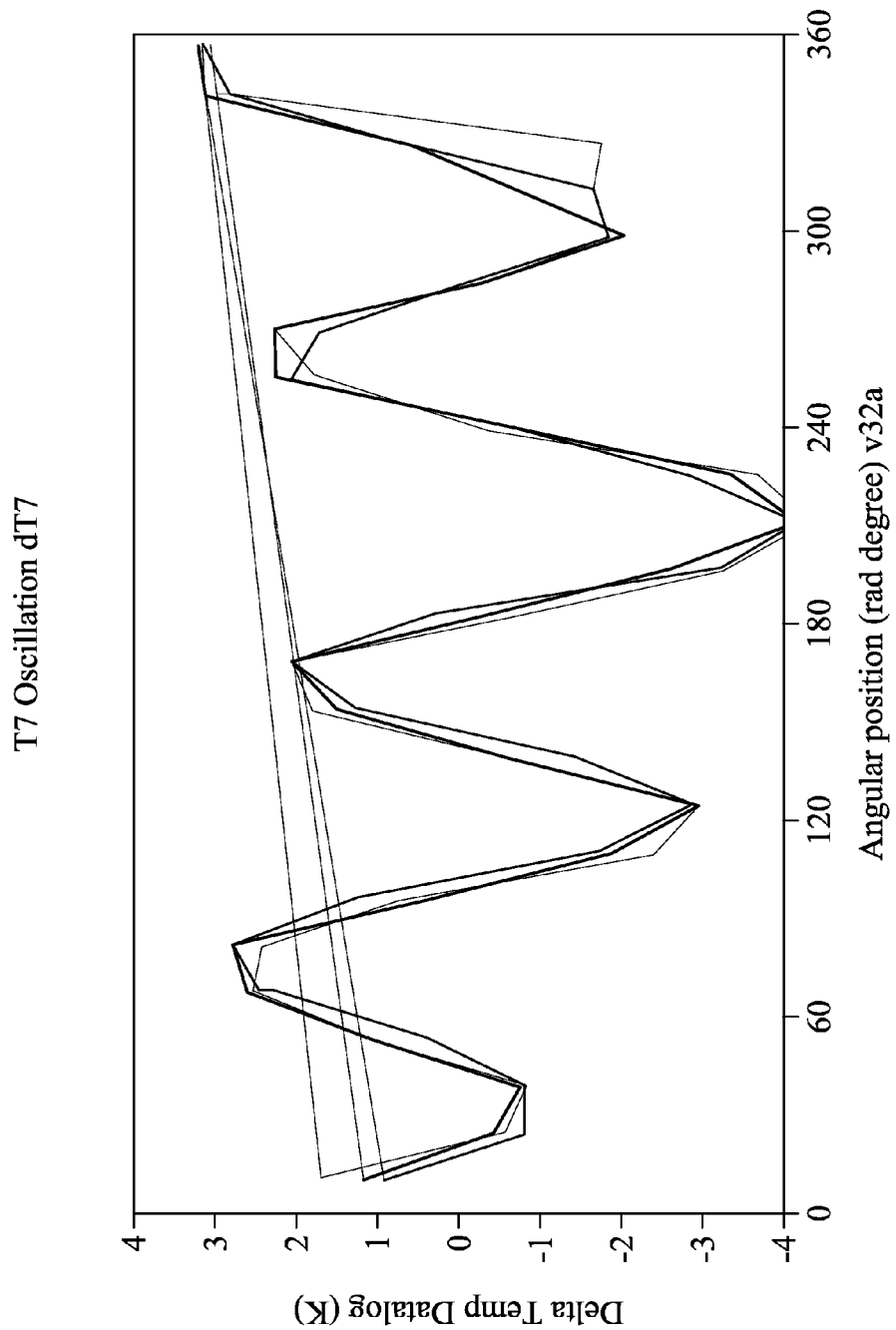
FIG. 4 is a graph showing temperature uniformity data versus angular position over three periods obtained from the temperature controller data of the probes (T7) shown in FIG. 2.

This operation also transforms the substrate reverse side data to the front side, in order to match the temperature data with metrology data (that measures the front side). For the example T7 data in FIG. 2 the transformation result is shown in the graph of FIG. 4. It can be seen that all 3 periods from FIG. 2 now are plotted on top of each other. This is a special case, when the rotational frequency is exactly 4 Hz. For instance, by selecting a rotation frequency that is 1.33% lower than 4 Hz each rotation the temperature location would move by 4.8 degrees relative to the rotor, or substrate. One can increase the resolution using that method, as the number of points on the substrate is increased three fold when three consecutive rotations are considered.

In example procedure (i), substrate temperature uniformities $dT_o$ (a, rP), $dT_oc(v,a_o,rP)$ and $dT_o$ ROT(v,$a_o$,rP) are extrapolated at positions X, and Y, to provide higher resolution for the contour maps.

For the $dT_o$ uniformity, the transformation takes into account that the time is obtained from angle function (a) by:

$$t=tss1+a/RP(t) \qquad \text{i.}$$

$$dT_o(a,rP) \rightarrow dTa(t,X,Y)$$

Thereafter:

$$dT_oc(v,a_o,rP) \rightarrow dTac(v,X,Y)$$

$$dT_oROT(v,a_o,rP) \rightarrow dTaROT(v,X,Y)$$

Figure 5:
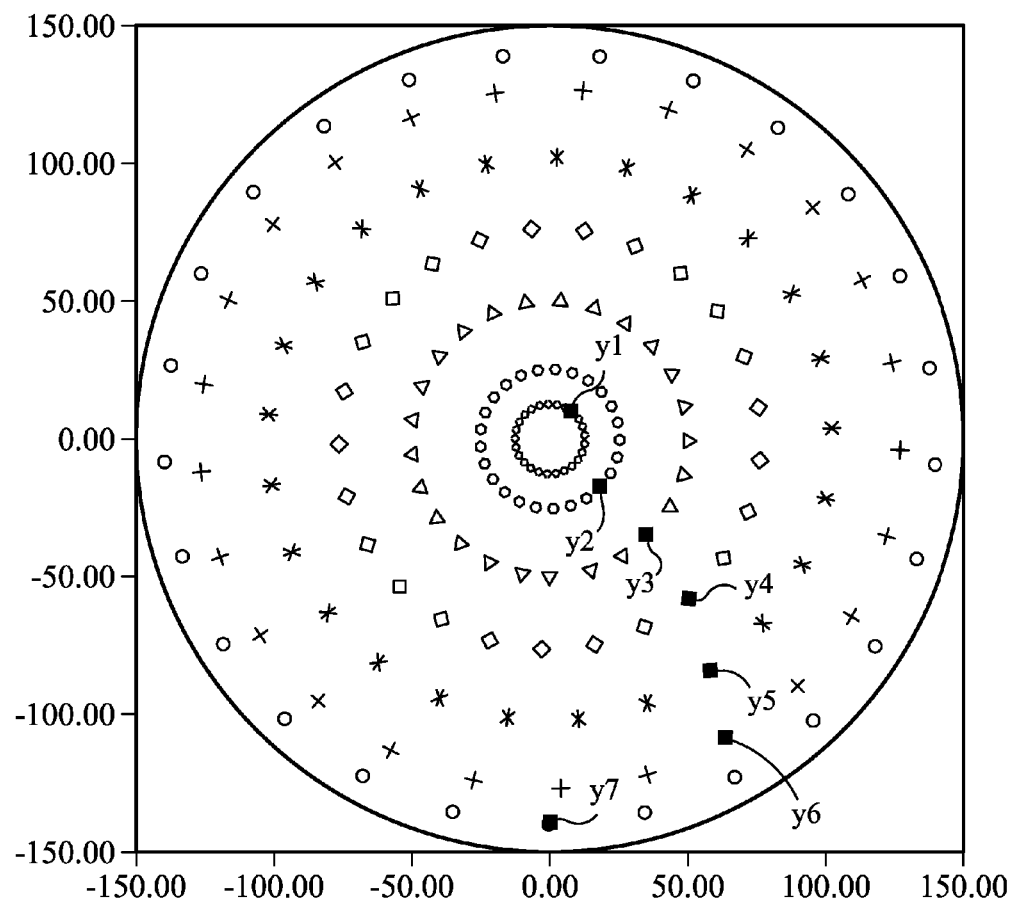
FIG. 5 is an exemplary mapping of a substrate showing locations on the substrate surface at which temperature data may be obtained according to some embodiments of the present invention.

As an example, see FIG. 5 which is an exemplary plan view (mapping) over a substrate showing locations on the substrate at which temperature data T(t,n) is obtained at a 4 Hz rotation speed and 100 Hz data rate for a time $t=t_x$, when the notch is at the same position as T7 (shown as filled squares and named yn). The substrate center is the same as the rotation center.

The remaining points (shown as plus signs) on the radial positions rP(n) (about 14.4° apart) result from the 10 ms time steps (100 Hz data rate, 4 Hz rotation speed). After a full rotation of the substrate the starting points are matched again.

Figure 6:
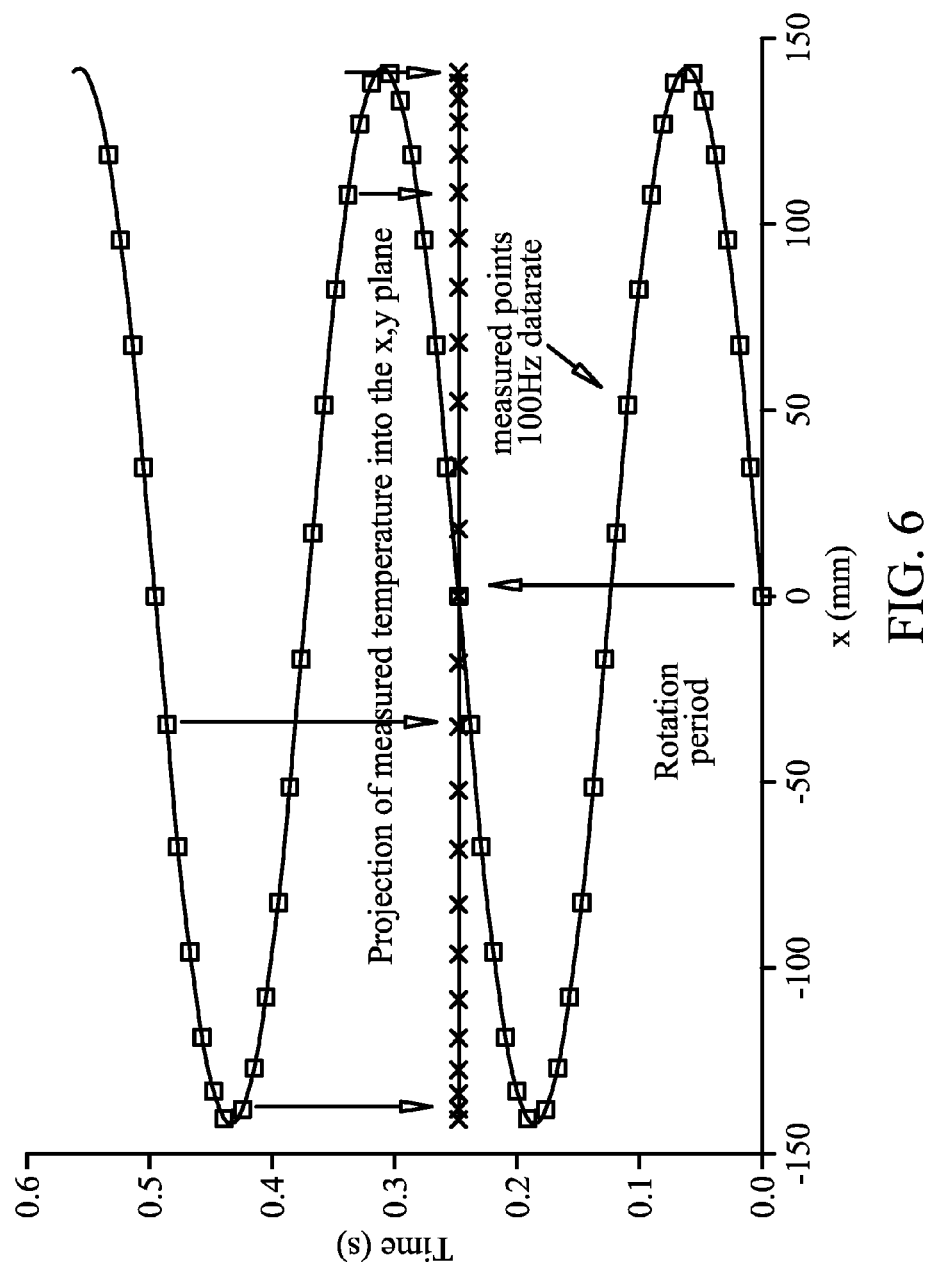
FIG. 6 is a graph showing temperature measurement points mapped in time and space, indicating how temperature measurements may be projected onto the x/y plane of the substrate according to embodiments of the present invention.
Figure 7:
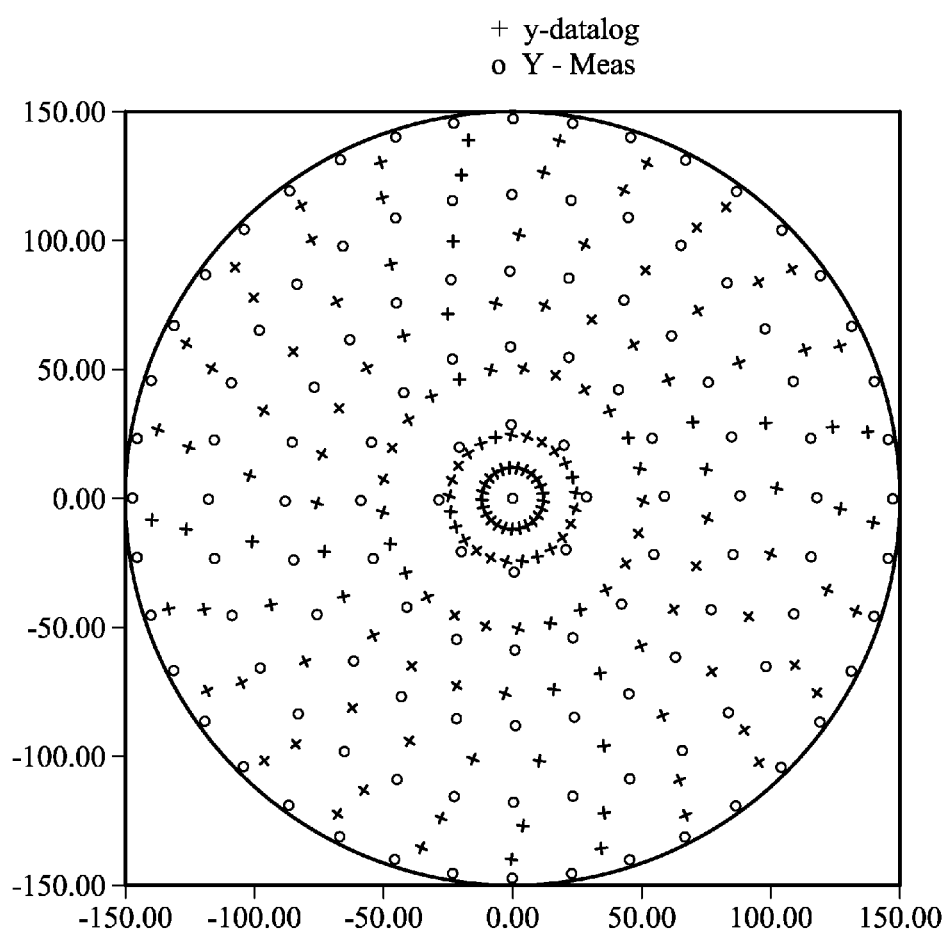
FIG. 7 is an exemplary high-resolution mapping of a substrate showing an increased number of locations on the substrate surface at which temperature data may be obtained according to some embodiments of the present invention.

FIG. 6 is a graph showing temperature measurement points mapped in time and space, indicating how temperature measurements are projected onto the x/y plane of the substrate. All points of one full rotation are collected to obtain data for the map.

It is possible to collect all of the temperature data over one rotation, and to prepare a contour map based on the data locations as shown in FIG. 5. However, as data for higher-resolution contours typically requires more positions on the substrate, as indicated in the contour map shown in FIG. 7 (121 point metrology contour map) the data may be interpolated from neighboring data points. Interpolation may be performed to provide data based on the measured points around it. For example, according to one embodiment, interpolation may be performed by location on the x,y plane of the substrate by using neighboring data points to generate multiple gradients based on next and next-next neighbors. A final interpolation result may also use spatially averaged gradients as well as the values of closest neighbors to obtain a datapoint. Known interpolation algorithms such as Delaunay triangulation may be employed to calculate these points as well as to obtain smoothed contour lines and to generate a color image.

According to some embodiments of the invention, a 'time above temperature' may be determined for CDT (e.g., no map is plotted at the time of measurement). The time above temperature may be calculated from the TTR(t,n) data which is generated from the Fourier transformation instead of a moving average. In addition, a peak temperature may also be determined for CDT (e.g., no map is plotted at the time). The peak temperature may be determined from the TTR(t,n) data which is generated from the Fourier transformation instead of a moving average. Both parameters may be plotted on a contour map.

It is noted that in alternative embodiments of the invention, the example procedures described above may be performed in different orders and/or only a subset of the procedures may be performed. For example, in one or more embodiments, the generation of temperature uniformity or rotational uniformity data may not be performed and a temperature contour map may be generated directly.

Figure 8:
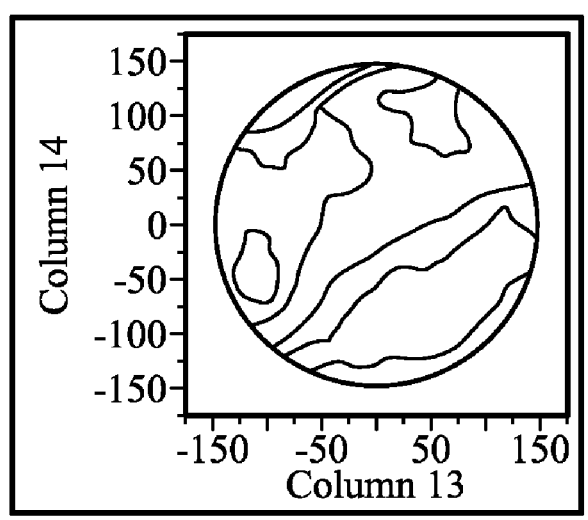
FIG. 8 is an exemplary contour map of temperature data according to some embodiments of the present invention.

The calculated values may be displayed in a manner replicating common displays of standard metrology tools. Numerous quantitative data may be displayed and/or stored including:

Mean (over n)–TTR(t,n)
Standard Deviation
CV (coefficient of variation) Std. Deviation/Mean*100 with % label
Maximum
Minimum
Range
Temperature Variation Side to Side (Amplitude): AMP(v, n)
Temperature Variation Side to Side (Phase): PSI(v, n)
List of data of the substrate map: t, v, TT, TTc
v, X, Y dTa, dTac, dTaROT Orientation relative to the chamber may be indicated and may or may not include a graphic representation of notch position. An exemplary contour map is shown in FIG. 8. The display may allow user control of a number of features including range scaling, allowing a user to set a fixed range than can be carried over to a next selected (sigma based) condition without resetting range on contour map. Control labels may be toggled on or off, and a cursor may be scanned across the contour map to display calculated values.

In addition to determining temperature across a substrate, the temperature measurement controller 120 may be employed to detect substrate placement. For example, if the substrate 110 is positioned improperly on the edge ring 108, the temperature profile across the substrate 110 will be less uniform, particularly at the edges of the substrate 110. FIG. 9A is an exemplary temperature contour map determined in accordance with the present invention for a substrate that is properly positioned on the edge ring 108 during thermal processing. As seen in FIG. 9A by the limited number of contours, the temperature across the substrate is primarily uniform. FIGS. 9B-E are temperature contour maps determined in accordance with embodiments of the present invention in which the substrate is shifted to the left (FIG. 9B), right (FIG. 9C), up (FIG. 9D) and down (FIG. 9E) relative to the edge ring 108. As indicated by reference numerals 1201-1207 in FIGS. 9B-E, respectively, a reduced temperature edge region appears at a leading edge of a substrate that is shifted.

The temperature measurement controller 120 may be adapted to monitor the temperature at the edges of the substrate 110 to detect if the substrate 110 is improperly positioned. For instance, the temperature measurement controller 120 may detect edge temperature variations, issue an alert and/or cause processing of the substrate 110 to stop. Likewise, the temperature measurement controller 120 may use temperature information to calculate and/or otherwise determine an (corrective) offset for a substrate handler and/or robot used to position the substrate 110 within the processing chamber 102 (e.g., to correct position of the substrate 110 and/or of substrates subsequently processed within the processing chamber 102).

In some exemplary embodiments, a substrate may be shifted by numerous known amounts relative to the edge ring 108. For each shifted location, a temperature map for the substrate during a thermal process may be measured. A database or table of values for edge temperatures may be determined and correlated with known substrate shift amounts. Subsequent edge temperature measurements may be compared to the database and/or table to determine the appropriate amount of adjustment to be made to a robot or substrate handler so that subsequent substrates are properly positioned relative to the edge ring 108. Such a process may be iterative (e.g., several adjustments may be made over the course of several substrates). An algorithm also may be developed in which average radial temperature trajectory is calculated and subtracted from the actual temperature data to derive the deviation from average for each point on a substrate. This deviation may be used to calculate a substrate positioning offset error.

In some embodiments, the temperature measurement controller 120 may detect substrate quality, such as for tool qualification (e.g., initial tool qualification, post maintenance tool qualification, etc.). For example, the temperature information across the substrate 110 may be used to identify implant issues such as improper or non-uniform implant levels by ensuring that temperature variations during RTP are not affecting such properties as sheet resistance. In some embodiments, if sheet resistance values for a processed substrate are out of tolerance, use of the present invention may rule out RTP issues by confirming that temperature uniformity was satisfactory during processing (e.g., the temperature across the substrate did not vary enough to cause the observed sheet resistance variations).

RTP issues, such as during RTP tool or process development, may also be identified from temperature information. For example, the affects of changes in gas flow rates, type of gases used, temperature ramp rates, edge ring design, lamp design, lamp-substrate spacing, process time, and/or the like, on substrate temperature may be studied with the present invention (e.g., by observing the affects of such changes on temperature uniformity and/or contour). Additionally, the temperature measurement controller 120 may identify substrate-to-substrate variations such as surface roughness variations, absolute substrate thickness variations, implant dose variations, other thickness variations, etc., based on temperature uniformity variations between substrates.

In one or more embodiments, the temperature measurement controller 120 may analyze temperature information across substrates to test and/or screen hardware performance such as lamp head uniformity, tool health, or the like. Tool repeatability may be analyzed by analyzing temperature information from similar or identical substrates processed under similar or identical conditions in an RTP tool. Likewise, chamber matching may be performed by analyzing temperature information from similar or identical substrates processed under similar or identical conditions in multiple RTP tools.

In at least one embodiment, the temperature measurement controller 120 may perform remote diagnostics on the RTP tool 100 by monitoring and/or analyzing temperature information across a substrate. For example, the affects of test recipes, using each lamp selectively (e.g., one at a time), etc., on temperature/temperature uniformity may be analyzed. As stated above, the temperature measurement controller 120 may assist in hardware development by determining how new hardware such as new or modified lamp head arrangements, maglev assemblies, central assemblies, etc., affect temperature uniformity across a substrate.

Temperature information across a substrate may be determined in real time or in approximate real time (e.g., before a subsequent substrate is processed). Further, monitor substrates are not required and do not need to be moved to stand alone metrology tools and/or queued for measurement. For example, inexpensive "dummy" substrates may be used in place of more expensive, calibration-grade monitor substrates. Additionally, such a large volume of temperature data allows temperature evolution to be studied at virtually every location across a substrate during RTP processing, providing additional insight into RTP processing.

In some embodiments, spectral analysis of temperature signals from the pyrometers may allow separation of different sources of substrate temperature uniformity variations such as gas flows, noise from a power grid, hardware contributions, etc. For example, by examining temperature data in the frequency spectrum, temperature variations and/or contributions from various sources may be observed at the rotation frequency of the substrate, at multiples of the rotation frequency or at some other system harmonic.

Figure 11:
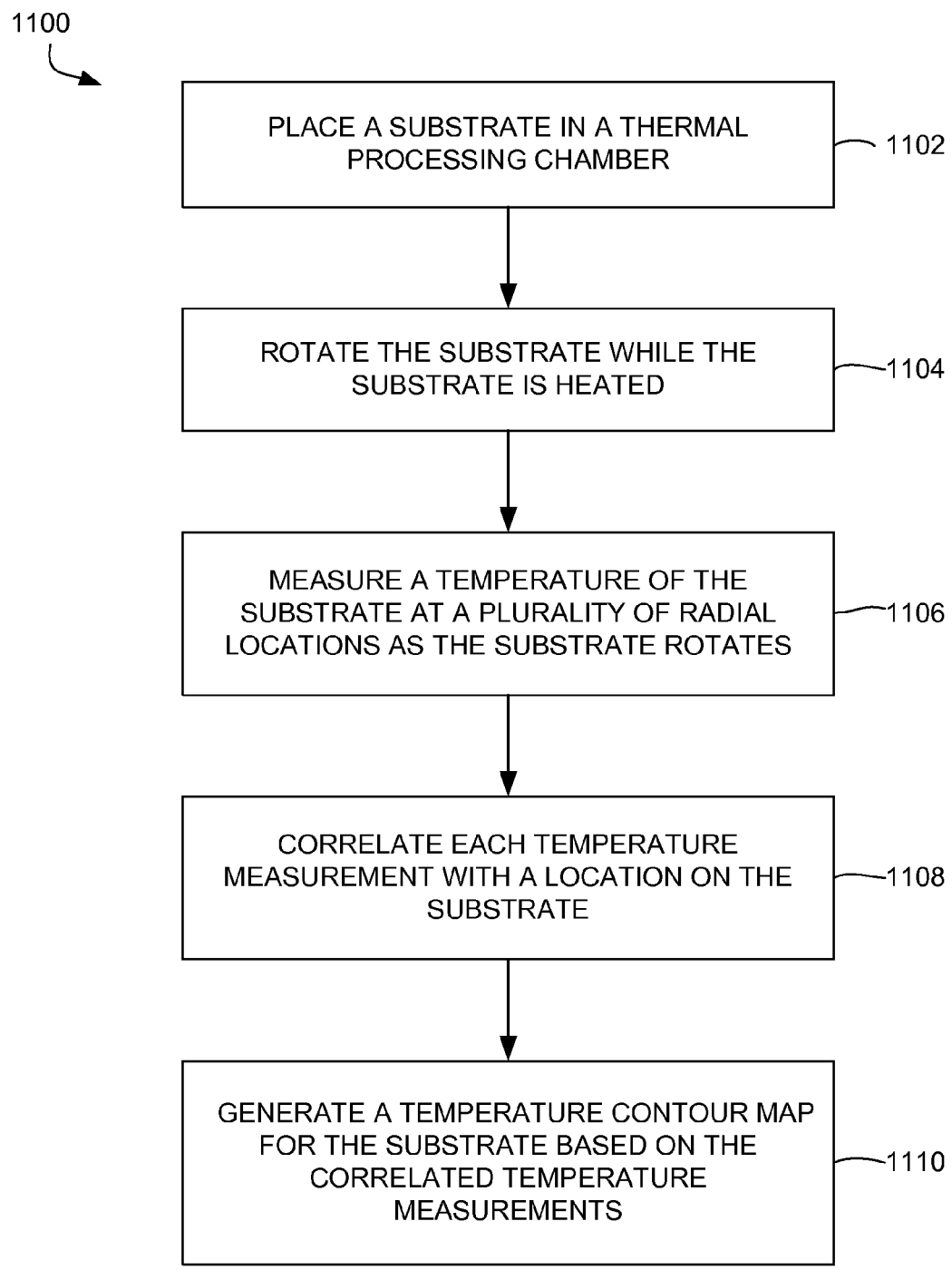
FIG. 11 is a flowchart depicting an example method 1100 according to embodiments of the present invention.

Turning to FIG. 11, a flowchart depicting an example method 1100 according to embodiments of the present invention is provided. In step 1102, a substrate is placed in a thermal processing chamber. In step 1104, the substrate is rotated while the substrate is heated. In step 1106, a temperature of the substrate at a plurality of radial locations is measured as the substrate rotates. In step 1108, each temperature measurement is correlated with a location on the substrate. In step 1110, a temperature contour map is generated for the substrate based on the correlated temperature measurements.

Through use of the present invention, temperature measurement across a substrate may be derived from existing temperature and substrate position data and used to provide "virtual" metrology for a substrate (e.g., eliminating, reducing or supplementing conventional metrology analysis). Numerous additional applications may be created.

Figure 10:
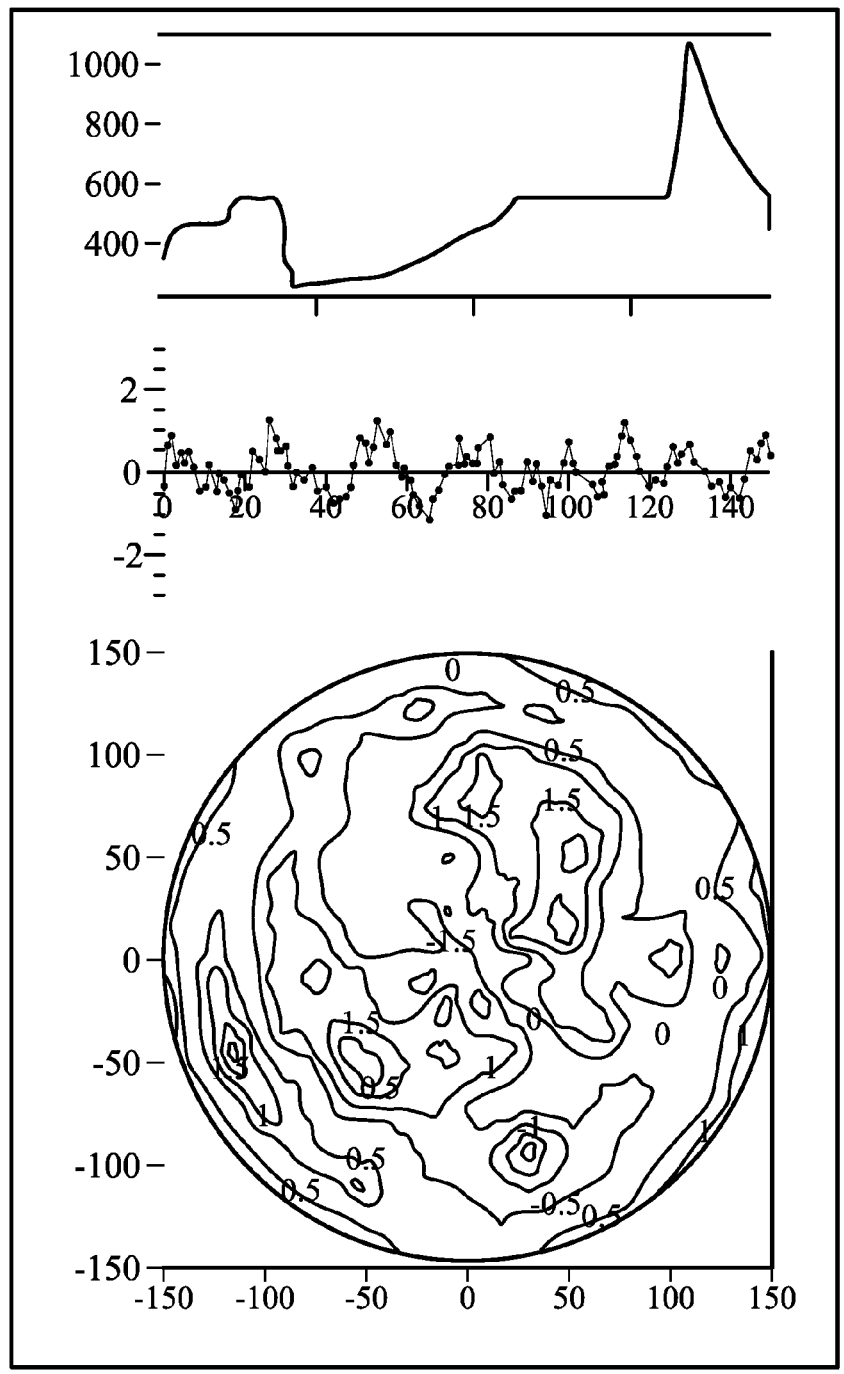
FIG. 10 is an exemplary snapshot of a temperature contour across a substrate as provided in accordance with embodiments of the present invention.

The foregoing description discloses only exemplary embodiments of the invention. Modifications of the above disclosed apparatus and methods which fall within the scope of the invention will be readily apparent to those of ordinary skill in the art. For instance, temperature maps of a substrate may be combined to form a "movie" that shows temperature evolution across the substrate during a thermal process. Such a movie may be formed by combining various temperature maps (snapshots) of the substrate determined for multiple times during the thermal process. For example, FIG. 10 is an exemplary snapshot of a temperature contour across a substrate during a spike anneal as determined in accordance with the present invention. In some embodiments, the substrate may remain stationary while the sensors (e.g., pyrometers) and/or the heating elements (e.g., lamp heads) are rotated. In some embodiments, many radial arrays and/or concentric arrays of sensors (e.g., pyrometers) may be disposed above or below the substrate.

Accordingly, while the present invention has been disclosed in connection with exemplary embodiments thereof, it should be understood that other embodiments may fall within the spirit and scope of the invention, as defined by the following claims.

The invention claimed is:

1. A method of measuring substrate temperature uniformity comprising:
   placing a substrate in a thermal processing chamber;
   rotating the substrate while the substrate is heated;
   measuring a temperature of the substrate at a plurality of radial locations as the substrate rotates;
   correlating each temperature measurement with a location on the substrate;
   generating a temperature contour map for the substrate based on the correlated temperature measurements;
   determining a degree of temperature uniformity based on the temperature contour map;
   retrieving stored reference information; and
   determining an offset of the substrate on a rotation assembly based on the determined degree of temperature uniformity and the retrieved stored information.

2. The method of claim 1 wherein rotating the substrate comprises magnetically levitating the substrate and rotating the magnetically levitated substrate.

3. The method of claim 1 wherein measuring a temperature of the substrate at a plurality of radial locations as the substrate rotates comprises employing a plurality of pyrometers to measure temperature at the plurality of radial locations.

4. The method of claim 1, further comprising:
   generating a temperature uniformity contour map for the substrate.

5. The method of claim 1, further comprising:
   determining a peak temperature at locations on the substrate based on the temperature measurements and the correlation of the temperature measurements with locations on the substrate.

6. The method of claim 5, further comprising:
   generating a peak temperature contour map for the substrate.

7. The method of claim 1, further comprising:
   determining a time above temperature at locations on the substrate based on the temperature measurements and the correlation of the temperature measurements with locations on the substrate.

8. The method of claim 7, further comprising:
   generating a time above temperature contour map for the substrate.

9. The method of claim 1, further comprising:
   determining a temperature gradient at locations on the substrate based on the temperature measurements and the correlation of the temperature measurements with locations on the substrate.

10. The method of claim 9, further comprising:
    generating a temperature gradient contour map for the substrate.

11. The method of claim 1, wherein an off-center placement is determined by a level of temperature non-uniformity.

12. The method of claim 1, wherein a degree of substrate temperature uniformity is determined based on the temperature measurements and the correlation of the temperature measurements with locations on the substrate.

13. The method of claim 1, wherein the temperature measurements are made in real time or in near real time.

14. An apparatus for measuring substrate temperature uniformity comprising:
    a thermal processing chamber including:
       a central assembly having a rotation assembly adapted to support and rotate the substrate;
       a heat source adapted to apply heat to the substrate; and
       a plurality of temperature probes positioned with respect to the central assembly so as to measure temperature at a plurality of radial locations on the substrate as the substrate rotates; and
    a temperature measurement controller adapted to:
       correlate temperature measurements locations on the substrate and to generate a temperature contour map for the substrate based on the correlated temperature measurements;
       determine a degree of temperature uniformity based on the temperature contour map;
       retrieve stored reference information; and
       determine an offset of the substrate on a rotation assembly based on the determined degree of temperature uniformity and the retrieved stored reference information.

15. The apparatus of claim 14, wherein the rotation assembly comprises a magnetic levitation (maglev) assembly.

16. The apparatus of claim 14, wherein the plurality of temperature probes comprise pyrometers.

17. The apparatus of claim 14, wherein the temperature measurement controller is adapted to determine a peak temperature at locations on the substrate based on the temperature measurements and the correlation of the temperature measurements with locations on the substrate.

18. The apparatus of claim 14, wherein the temperature measurement controller is adapted to determine a time above temperature at locations on the substrate based on the temperature measurements and the correlation of the temperature measurements with locations on the substrate.

19. The apparatus of claim 14, wherein the temperature measurement controller is adapted to determine a temperature gradient at locations on the substrate based on the temperature measurements and the correlation of the temperature measurements with locations on the substrate.

* * * * *